United States Patent Office 2,727,907
Patented Dec. 20, 1955

2,727,907

DERIVATIVES OF 16-ALKANOYLOXY-17α-HYDROXYPREGNEN-20-ONES

Leland J. Chinn, Morton Grove, and Lawrence E. Thielen, Chicago, Ill., assignors to G. D. Searle & Co., Chicago, Ill., a corporation of Illinois No Drawing. Application November 19, 1953,
Serial No. 393,214

14 Claims. (Cl. 260—397.4)

Our invention relates to a new group of 17α-hydroxypregnen-20-one derivatives and, more specifically, to those substituted in the 3-position by an oxo, an etherified or esterified hydroxy group and in the 16-position by a lower alkanoyloxy radical and to those substituted in the 21-position by a hydroxy or a lower alkanoyloxy radical. In addition, these compounds can be substituted in the 11-position by a hydroxy or an oxo group.

The compounds of our invention are the 3-oxo-pregnenes, 3-alkoxypregnenes, and 3-alkanoyloxypregnenes which have the following structure in the rings C and D

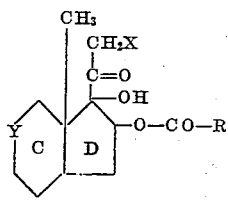

wherein R is a hydrogen or a lower alkyl radical, X is a hydrogen, hydroxy or lower alkanoyloxy radical and Y is a methylene, carbinol or carbonyl radical.

The radical R can be hydrogen or a lower alkyl group such as methyl, ethyl, propyl, butyl, amyl, hexyl, cyclopentyl and cyclohexyl. Also within the scope of our invention are compounds in which R represents a phenyl radical or a lower cycloalkylalkyl radical such as cyclohexylmethyl and cyclopentylethyl. The 3-alkoxy group is a lower alkyloxy group such as methoxy, ethoxy, propoxy, butoxy, pentoxy, hexoxy and the like. The lower alkanoyl radicals in the 3-, 16- and 21-alkanoyloxy groups mentioned herein, which are suitable for the purposes of our invention, are those derived from the lower alkanoic or fatty acids; suitable alkanoyloxy groups are formyloxy, acetoxy propionoxy, butyroxy, valeroxy caproxy, and the like. The formyloxy radicals are of special utility since they permit selective deesterification by mild alkaline reagents without attack on higher alkanoyloxy radicals and without D-ring rearrangement to D-homo compounds. The radical X can also represent an aroyloxy such as a benzoyloxy radical.

Suitable starting materials for the purposes of our invention are 3-hydroxy-16,17-oxido-5-pregnen-20-one and its derivatives wherein the 3-hydroxy group is etherified or esterified by a lower alkyloxy or lower alkanoyloxy radical. Other suitable starting materials are 16,17-oxidoprogesterone, its 11-hydroxy and 11-oxo derivatives, as well as the 21-lower alkanoyloxy derivatives thereof. These 16, 17-oxido compounds are reacted with lower alkanoic acids according to the reaction scheme

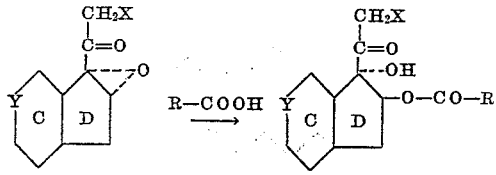

wherein R, X, and Y are defined as hereinabove. The reaction occurs without external heating. In the case of formic acid, no additional reagent is necessary. In the case of acetic acid and higher alkanoic acids, we prefer to add a small quantity of sulfuric acid to the reaction mixture. In the case where Y represents an α-hydroxymethylene radical, 11-esterification can occur as a side reaction.

The compounds of our invention are valuable intermediates in organic synthesis. Thus, treatment of the 16-alkanoyloxy-17-hydroxy steroids and, particularly, of the 16-acetoxy-17-hydroxy compounds with zinc oxide at sublimation temperature causes replacement of the 16-radical by an oxo group and replacement of the 17-hydroxy radical by a hydrogen atom. As a byproduct, one obtains 16,17α-dialkanoyloxy-17-oxo-17α-methyl-D-homopregnenes. The same type of ring enlargement occurs upon treatment of a 16-acetoxy-17α-hydroxy steroid of the claimed type on treatment with alkali carbonates in aqueous alkanol solutions. These D-homosteroids are potent antihypertensive agents.

The compounds of our invention have valuable pharmacological properties. Specifically, they provide agents which counteract the undesirable effects of the mineralocorticoid hormones. Even the claimed compounds of the species in which X represents a hydrogen atom produce such effects; one of the manifestations of this antagonism is a sodiouretic effect as opposed to the sodium retaining effect of electrocortin.

The compounds of our invention are also valuable as starting materials in the synthesis of electrocortin-like chemicals. Thus, deesterification of the 16β-alkanoyloxy and, preferably, the 16β-formyloxy radical, 16β,17α-dihydroxysteroids are obtained, these compounds are to be distinguished from the 16α,17α-dihydroxy isomers obtained by F. B. Colton by treatment of Δ¹⁶-pregnenes with one molecular equivalent of osmium tetroxide in a solvent such as ether or tertiary butanol, followed by deosmylation with sodium sulfite. The use of the claimed compounds for the preparation of antihypertensive D-homosteroids is mentioned hereinabove.

The examples below illustrate in further detail certain of the compounds which constitute our invention, some of the reactions which they undergo and methods for their synthesis. However, they are not to be construed as limiting the invention in spirit or in scope. In these examples, temperatures are indicated in degrees centigrade (° C.) and quantities of materials in parts by weight.

*Example 1*

2 parts of 16,17-epoxyprogesterone are dissolved in 178 parts of formic acid at room temperature and allowed to stand for 72 hours. There is a color change from blue to blue-green, and then to green. The reaction mixture is then poured into approximately 1500 parts of water and the precipitate is collected on a filter and washed with water. The crude product is recrystallized twice from methanol to yield 16β-formyloxy-17α-hydroxyprogesterone which melts at about 213.5–216° C. The ultraviolet absorption spectrum shows a maximum at 241 millimicrons with a molecular extinction coefficient of 18,200. The specific rotation of a 1% dioxane solution is $\alpha_D = +100°$. This compound has the structural formula

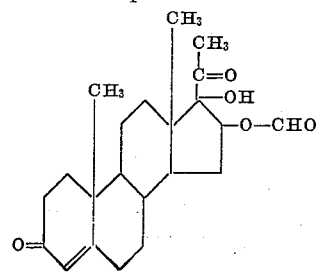

Example 2

To a solution of 5 parts of 16,17-oxidoprogesterone in 105 parts of glacial acetic acid are added 18 parts of concentrated sulfuric acid. The reaction mixture is allowed to stand at room temperature for 30 minutes. To the resulting red solution, 2000 parts of water are added. The resulting nearly colorless mixture is extracted with ether and the ethereal solution in turn is extracted successively with water and saturated sodium bicarbonate solution, dried over anhydrous potassium carbonate and evaporated to dryness. The viscous yellow residue is crystallized first from a mixture of benzene and petroleum ether and then from methanol. The 16-acetoxy-17α-hydroxyprogesterone thus obtained melts at about 181.5–183° C. The specific rotation of a dioxane solution is $[\alpha]_D = +102°$. The ultraviolet absorption spectrum of a methanolic solution shows a maximum at 240 millimicrons with a molecular extinction coefficient of 16,200. The infrared absorption of a 2% chloroform solution shows maxima at 2.78, 2.89, 5.85, 6.03, 6.20 and 8.05 microns. The compound has the structural formula

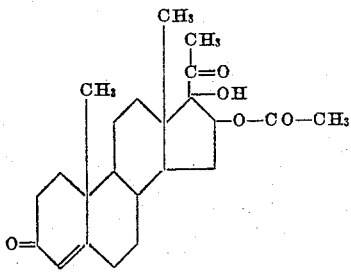

Example 3

A solution of 6 parts of potassium carbonate in 200 parts of water is added to a solution of 6.3 parts of 16-acetoxy-17α-hydroxyprogesterone in 480 parts of methanol at room temperature. After standing for 24 hours, the mixture is freed from methanol by vacuum distillation at room temperature and then poured into 3000 parts of water. The resulting precipitate is collected on a filter and washed with water. The crude product is then recrystallized repeatedly from ethyl acetate to yield crystals which melt at about 220–223° C. with preliminary shrinking at 217° C. and sweating at 219° C. The ultraviolet absorption spectrum shows a maximum at 240 millimicrons with a molecular extinction coefficient of 18,200. Infrared maxima as determined in potassium bromide appear at 2.90, 5.95, 5.98, 6.05 and 6.22 microns. The product is presumably the 1,3-dihydroxy-1,10a,12a-trimethyl - 1,2,3,4,4a,4b,5,6,8,9,10,10a,10b,11,12,12a - hexadecahydrochrysen-2,8-dione of the structural formula

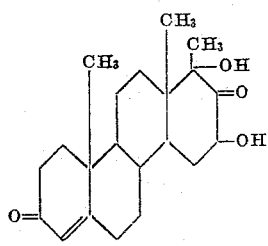

Example 4

A solution of 3 parts of 1,3-dihydroxy-1,10a,12a-trimethyl - 1,2,3,4,4a,4b,5,6,8,9,10,10a,10b,11,12,12a - hexadecahydrochrysen-2,8-dione in 100 parts of pyridine and 110 parts of acetic anhydride is stored at room temperature for 24 hours and poured into 5000 parts of water. The resulting precipitate is collected on a filter, washed with water and recrystallized twice from methanol to yield a product melting at about 201–203° C. The ultraviolet absorption spectrum shows a maximum at 240 millimicrons with a molecular extinction coefficient of about 17,400. The infrared absorption spectrum in potassium bromide shows maxima at 5.78, 6.02, 6.17, 7.97 and 8.10. This compound is presumably the 1,3-diacetoxy - 1,10a,12a - trimethyl - 1,2,3,4,4a,4b,5,6,8,9,10, 10a,10b,11,12,12a-hexadecahydrochrysen-2,8-dione of the structural formula

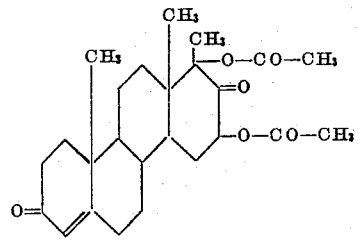

Example 5

A mixture of 50 parts of 16-acetoxy-17α-hydroxyprogesterone and 250 parts of zinc oxide is sublimed at 175–185° C. over a period of 8 to 19 hours. The sublimate is crystallized first from ether and then from a mixture of ether and petroleum ether. A negative ferric chloride test and the physical properties indicate that this product is identical with the diacetoxy compound of the preceding example.

The unsublimed residue is acidified with 5% hydrochloric acid and extracted with ether. The ethereal solution is in turn extracted successively with water, 5% aqueous sodium bicarbonate solution and with a saturated aqueous sodium chloride solution. It is then dried over anhydrous sodium sulfate, decolorized with charcoal and evaporated to dryness. The residual amorphous powder gives a green ferric chloride test. A methanol solution shows an ultraviolet maximum at 241 millimicrons with a molecular extinction coefficient of 16,100 and a shoulder at 270 millimicrons with an extinction coefficient of 3450. The ultraviolet adsorption spectrum of a 0.1–N methanolic potassium hydroxide solution shows a maximum at 240 millimicrons with a molecular extinction coefficient of 13,630 and at 350 millimicrons with a molecular extinction coefficient of 2543. A minimum is observed at 270 millimicrons with a molecular extinction coefficient of 1807. The evidence indicates the presence of a 17-acetyl-4-androstene-3,16-dione.

Example 6

To 5 parts of 3-hydroxy-16,17-oxido-5-pregnen-20-one is added a solution of 18 parts of concentrated sulfuric acid in 105 parts of glacial acetic acid. The red reaction mixture is gently warmed on the steam bath until solution is effected and then allowed to stand at room temperature for 30 minutes during which time a brownish-green color develops. It is poured into water and the resulting mixture is extracted with ether. The ethereal solution is successively washed with water, saturated sodium bicarbonate, and saturated chloride solution, dried over anhydrous sodium sulfate and evaporated to dryness. Upon vigorous stirring, the oily residue partially solidifies. After recrystallization from a mixture of benzene and petroleum ether, it melts at about 169.5 to 171° C. The infrared adsorption spectrum of a 2% chloroform solution shows maxima at 277, 2.90, 5.82 and 8.00 microns. The 3,16-diacetoxy-17α-hydroxy-5-pregnen-20-one thus obtained has the structural formula

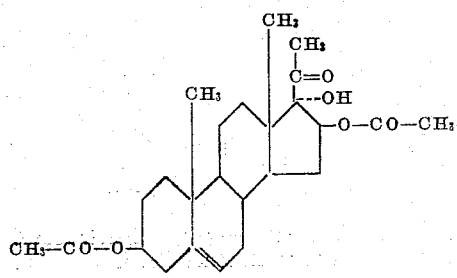

Example 7

To a solution of 10 parts of 21-acetoxy-16,17-epoxy-progesterone in 890 parts of 98–100% formic acid are added 50 parts of concentrated sulfuric acid with swirling. The mixture is permitted to stand at room temperature for one hour after which it is poured into water and stored at 0° C. The solid precipitate is collected on a filter, washed with water and recrystallized twice from methanol. The 16-formyloxy-17α-hydroxy-21-acetoxy-progesterone thus obtained melts at about 188–190° C. The ultraviolet absorption spectrum determined in a methanol solution shows a maximum at 240 millimicrons with a molecular extinction coefficient of 17,400. Using a potassium bromide disk infrared maxima are observed at 2.97, 5.78, 6.07, 6.22, 8.1 and 8.57 microns. The compound has the structural formula

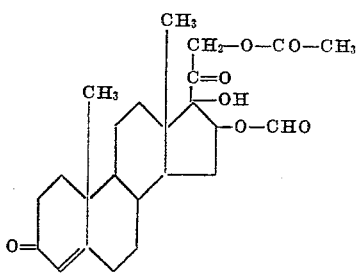

We claim:

1. The process of preparing a pregnene of the structural formula

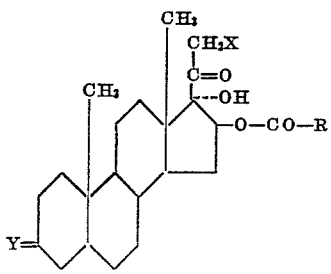

wherein the oxygen atom attached to carbon-16 is in the β-position, R is a member of the class consisting of hydrogen and lower alkyl radicals, X is a member of the class consisting of hydrogen and lower alkanoyloxy radicals, Y= is a member of the class consisting of oxo and

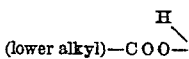

radicals, and wherein one of the bonds linking the carbon atom in position 5 to the carbon atoms in positions 4 and 6 is unsaturated, which comprises the treatment of a pregnene of the structural formula

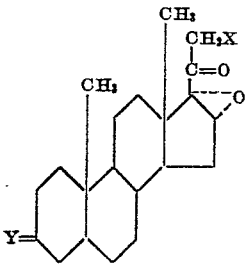

wherein X is defined as hereinabove, Y= is a member of the class consisting of oxo,

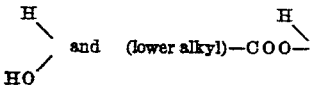

radicals, and wherein one of the bonds linking the carbon atom in position 5 to the carbon atoms in positions 4 and 6 is unsaturated, with an acid of the structural formula RCOOH, R being defined as hereinabove.

2. The process of preparing a 16β-(lower alkanoyloxy)-17α-hydroxy-4-pregnene-3,20-dione which comprises the treatment of 16,17-oxido-4-pregnene-3,20-dione with a lower alkanoic acid.

3. The process of preparing 16β-formyloxy-17α-hydroxy-4-pregnene-3,20-dione which comprises the treatment of 16,17-oxido-4-pregnene-3,20-dione with formic acid.

4. The process of preparing 16β-acetoxy-17α-hydroxy-4-pregnene-3,20-dione which comprises the treatment of 16,17-oxido-4-pregnene-3,20-dione with acetic acid.

5. The process of preparing a 3,16β-bis(lower alkanoyloxy)-17α-hydroxy-5-pregnen-20-one which comprises the treatment of 3-hydroxy-16,17 - oxido-5-pregnen-20-one with a lower alkanoic acid.

6. The process of preparing a 3,16β-diacetoxy-17α-hydroxy-5-pregnen-20-one which comprises the treatment of 3-hydroxy-16,17-oxido-5-pregnen-20-one with acetic acid.

7. The process of preparing a 16β,21-bis(lower alkanoyloxy)-17α-hydroxy-4-pregnene-3,20 - dione which comprises the treatment of a 16,17-oxido-21-(lower alkanoyloxy)-4-pregnene-3,20-dione with a lower alkanoic acid.

8. A pregnene of the structural formula

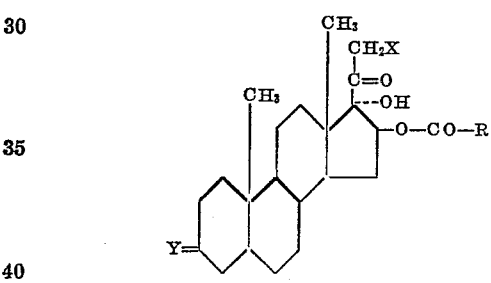

wherein the oxygen atom attached to carbon-16 is in the β-position, wherein R is a member of the class consisting of hydrogen and lower alkyl radicals, X is a member of the class consisting of hydrogen and lower alkanoyloxy radicals, Y= is a member of the class consisting of oxo and

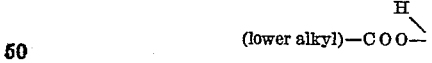

radicals, and wherein one of the bonds linking the carbon atom in position 5 to the carbon atoms in positions 4 and 6 is unsaturated.

9. A 16β-(lower alkanoyloxy)-17α-hydroxy-4-pregnene-3,20-dione.

10. A 16β-formyloxy-17α-hydroxy-4-pregnene - 3,20-dione.

11. A 16β-acetoxy-17α-hydroxy-4-pregnene-3,20-dione.

12. A 3,16β-bis(lower alkanoyloxy)-17α-hydroxy-5-pregnen-20-one.

13. A 3,16β-diacetoxy-17α-hydroxy-5-pregnen-20-one.

14. A 16β,21-bis(lower alkanoyloxy)-17α-hydroxy-4-pregnene-3,20-dione.

References Cited in the file of this patent

UNITED STATES PATENTS

| | | |
|---|---|---|
| 2,602,804 | Kendall | July 8, 1952 |
| 2,666,770 | Wall | Jan. 19, 1954 |
| 2,682,548 | Huffman | June 29, 1954 |

OTHER REFERENCES

Lardon et al.: Helv. Chim. Acta 24, 1127–40 (1941).